(12) United States Patent
Riachentsev

(10) Patent No.: US 7,866,530 B1
(45) Date of Patent: Jan. 11, 2011

(54) CLEAN TIP SOLDERING STATION

(75) Inventor: Valeri Riachentsev, 18435 Desert Marigold, Houston, TX (US) 77073

(73) Assignee: Valeri Riachentsev, Houston, TX (US)

( * ) Notice: Subject to any disclaimer, the term of this patent is extended or adjusted under 35 U.S.C. 154(b) by 0 days.

(21) Appl. No.: 12/803,440

(22) Filed: Jun. 28, 2010

(51) Int. Cl.
  B23K 3/03 (2006.01)
  B23K 3/06 (2006.01)
(52) U.S. Cl. .................... 228/51; 228/56.1; 219/229
(58) Field of Classification Search .............. None
  See application file for complete search history.

(56) References Cited

U.S. PATENT DOCUMENTS

| | | | | |
|---|---|---|---|---|
| 1,353,009 | A * | 9/1920 | Wright et al. .............. 228/57 |
| 1,927,570 | A * | 9/1933 | Lofthouse .................. 228/53 |
| 1,934,885 | A * | 11/1933 | Ring ........................ 228/53 |
| 2,068,728 | A * | 1/1937 | Amos ....................... 228/53 |
| 2,216,530 | A * | 10/1940 | Hollander .................. 228/52 |
| 2,615,415 | A * | 10/1952 | Wertheim et al. ........... 228/53 |
| 3,034,478 | A * | 5/1962 | Schwartz ................... 118/263 |
| 3,215,815 | A * | 11/1965 | Lerner ..................... 219/242 |
| 3,385,262 | A * | 5/1968 | Jacke et al. ............... 118/429 |
| 3,948,678 | A * | 4/1976 | Dezzani .................... 134/6 |
| 3,977,036 | A * | 8/1976 | Vanyi ...................... 15/118 |
| 4,287,408 | A * | 9/1981 | Wilson ..................... 219/475 |
| 4,509,670 | A * | 4/1985 | Cammarata ............... 228/34 |
| 4,583,673 | A * | 4/1986 | Mintchev et al. ........... 228/37 |
| 5,025,973 | A * | 6/1991 | Newton et al. ............. 228/55 |
| 5,048,742 | A * | 9/1991 | Fortune .................... 228/20.5 |
| 6,214,218 | B1 * | 4/2001 | Kawashima et al. ........ 210/179 |
| 2006/0243777 | A1 * | 11/2006 | Dhanjal .................... 228/101 |
| 2008/0067164 | A1 * | 3/2008 | Kuo ........................ 219/242 |
| 2009/0050673 | A1 * | 2/2009 | Althoff et al. ............. 228/11 |
| 2010/0089975 | A1 * | 4/2010 | Martin et al. ............. 228/51 |
| 2010/0187288 | A1 * | 7/2010 | Martin et al. ............. 228/51 |

FOREIGN PATENT DOCUMENTS

GB 2220161 A * 1/1990
JP 53-100151 A * 9/1978
JP 58-199658 A * 11/1983

* cited by examiner

Primary Examiner—Kiley Stoner

(57) ABSTRACT

A design and method to keep the iron tip clean by submerging in molten solder with no oxidation and dross is described. Wool submerged in the molten solder and by cone-hole reservoir provide extra protection of the tip. Molten solder has protected from the oxidation by the antioxidant applied over the molten solder and by keeping the solder temperature close to the crystallization temperature and by having the crystallized solder layer above the molten solder. Further improving the tip surface is made possible by the electrolyses provided by current running through the molten solder and the iron tip. Iron battery charging circuit through the molten solder and magnetic connector-holder is described.

17 Claims, 4 Drawing Sheets

CLEAN TIP SOLDERING STATION

BACKGROUND OF THE DISCLOSURE

1. Field of Disclosure

The present invention relates to the field of the bench soldering station using either battery powered wireless or wired soldering iron or soldering gun (in further—under the soldering iron are considered both and soldering gun and iron), soldering iron holder, and having soldering iron equipped with the fine tip for the small electronics parts and printed circuit board (PCB) soldering.

2. Description of the Related Arts

Well known and widely used soldering method where the soldering is provided by melting the solder core over the soldered parts with or without the flux. The soldering iron tip is hot and exposed to the air for oxidation, resulting the tip is gradually covering with the copper oxides and solder dross when sits in the holder. Such tip required to be periodically cleaned-up and replaced.

U.S. Pat. No. 3,977,036 disclosures the soldering iron holder and cleaning receptacles. According this patent, the iron holder has an extra reservoir preventing the tip from oxidation. This extra reservoir can be filled with the oil.

Another U.S. Pat. No. 3,215,815 has a reservoir filled with the molten solder preventing tip from the oxidation, but molten solder itself is still oxides by air oxygen resulting the solder dross appears on the solder surface and tip has to be cleaned-up from the dross picked up from the molten solder surface.

The present invention offers solution to use a molten solder reservoir as one of the part of iron holder for supporting the fine iron tip and keep the tip clean with no dross or oxides on the tip surface. Applied oil improves the quality of the soldering providing the cleaner gap between the close located PCB pads and legs of the electronics components.

SUMMARY OF THE DISCLOSURE

A soldering station described in this disclosure keeps soldering iron tip clean by: molten solder reservoir having support for the iron tip; antioxidant floating above solder; reservoir temperature controller; metal wool completely or partially submerged into the antioxidant and/or solder. Fine iron tip is protected from damage by reservoir having cone-hole bottom or/and applying the wool between the iron tip and reservoir bottom. The station is able to operate with a wired or wireless battery powered iron, where battery powered iron has a built-in control circuit sensing the contact between an iron tip and a solder and switching the battery from the battery charging mode to the tip heating mode. Also, the soldering station may include the power supply connected in series with the tip and solder and providing the extra tip cleaning and plating by the electrolysis process.

DETAILED DESCRIPTION OF THE DISCLOSURE

Figure 1:
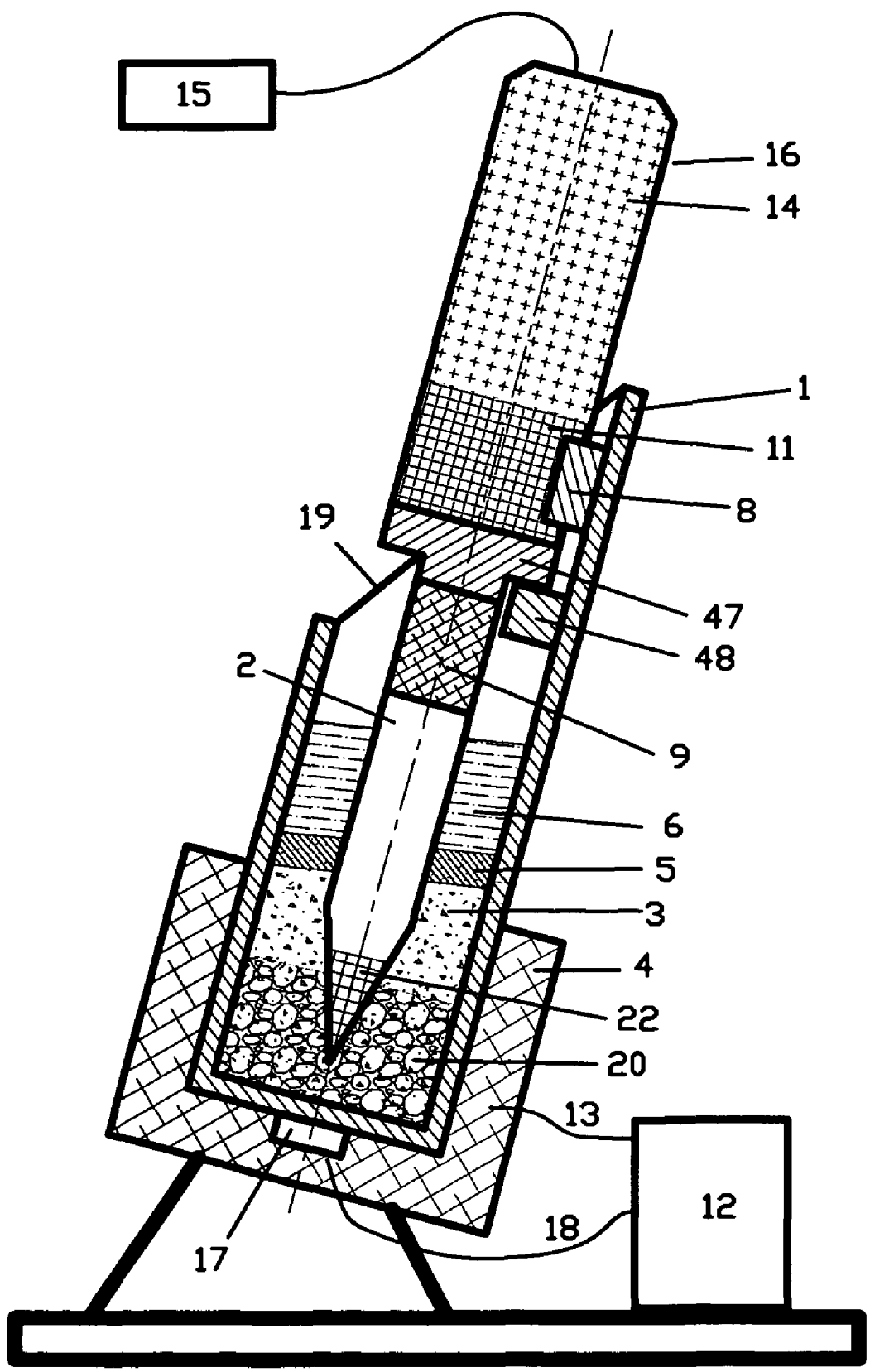
FIG. 1 shows a soldering station in assembly with a wired soldering iron.

Referring to the FIG. 1, the soldering station assembly includes: the soldering reservoir 1 filled with a molten solder 3 and equipped with a heater 4, dross 5 which may be produced by the molten solder 3. Antioxidant 6 is floating above the solder 3 and the dross 5. External power supply 12 is connected to the reservoir heater 4. Also, the soldering station comprises the soldering iron 16 having the heat-insulated and electrically-insulated handle 14, tip 2, and a tip heater 9. Iron is connected to the power supply 15. When soldering iron 16 is inserted into reservoir/holder 1, then tip 2 goes through the antioxidant 6, dross 5 (if any) and stops by the: wool 20, vertical support 47-48, and/or magnetic holder 11-8. Solder-adhesive end 22 of the tip 2 is submerged into molten solder 3. The reservoir is made of molten solder resistant material, such as stainless steel, ceramic etc.

Figure 8:
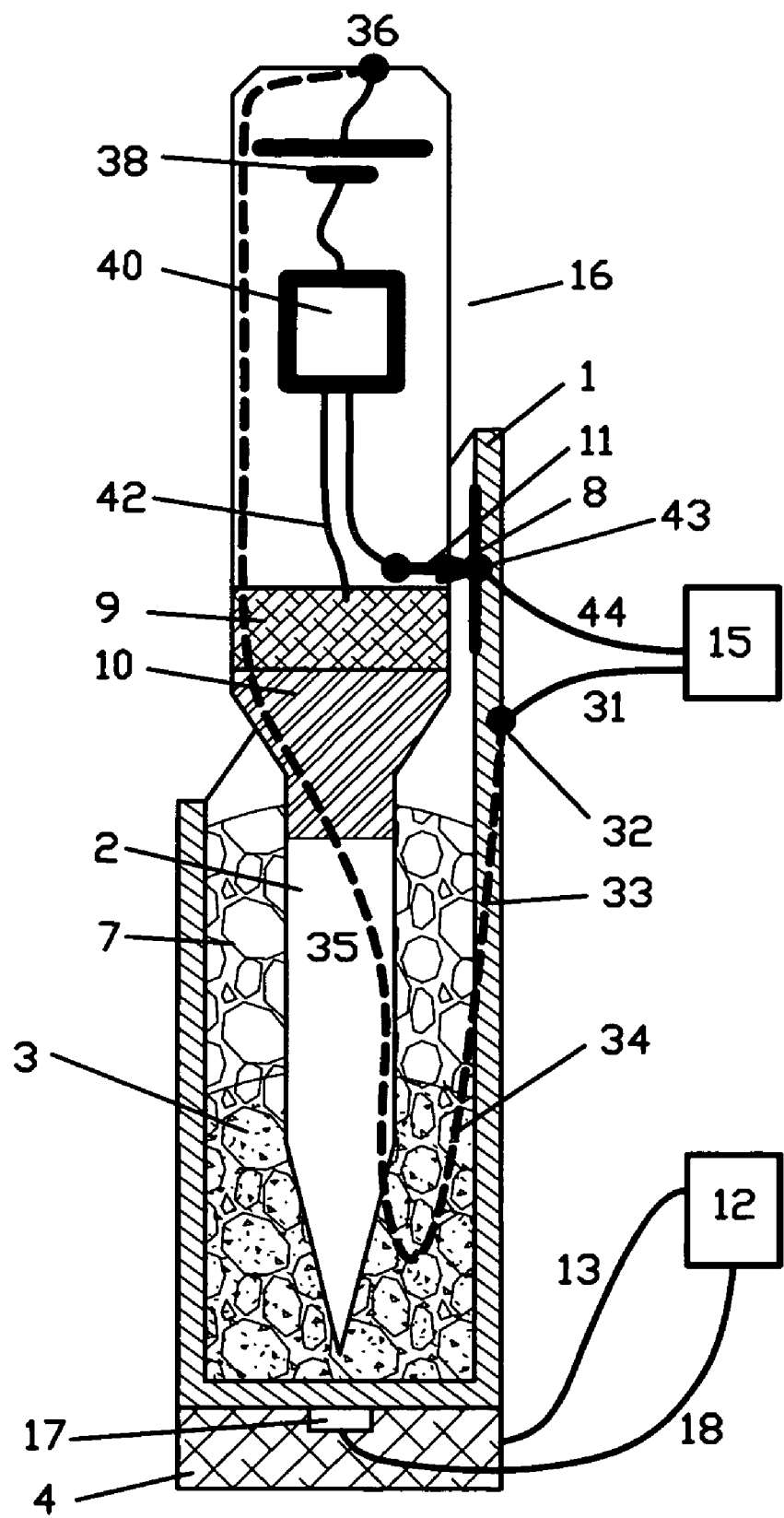
FIG. 8 shows a battery powered soldering iron electrical connections block-diagram.
Figure 9:
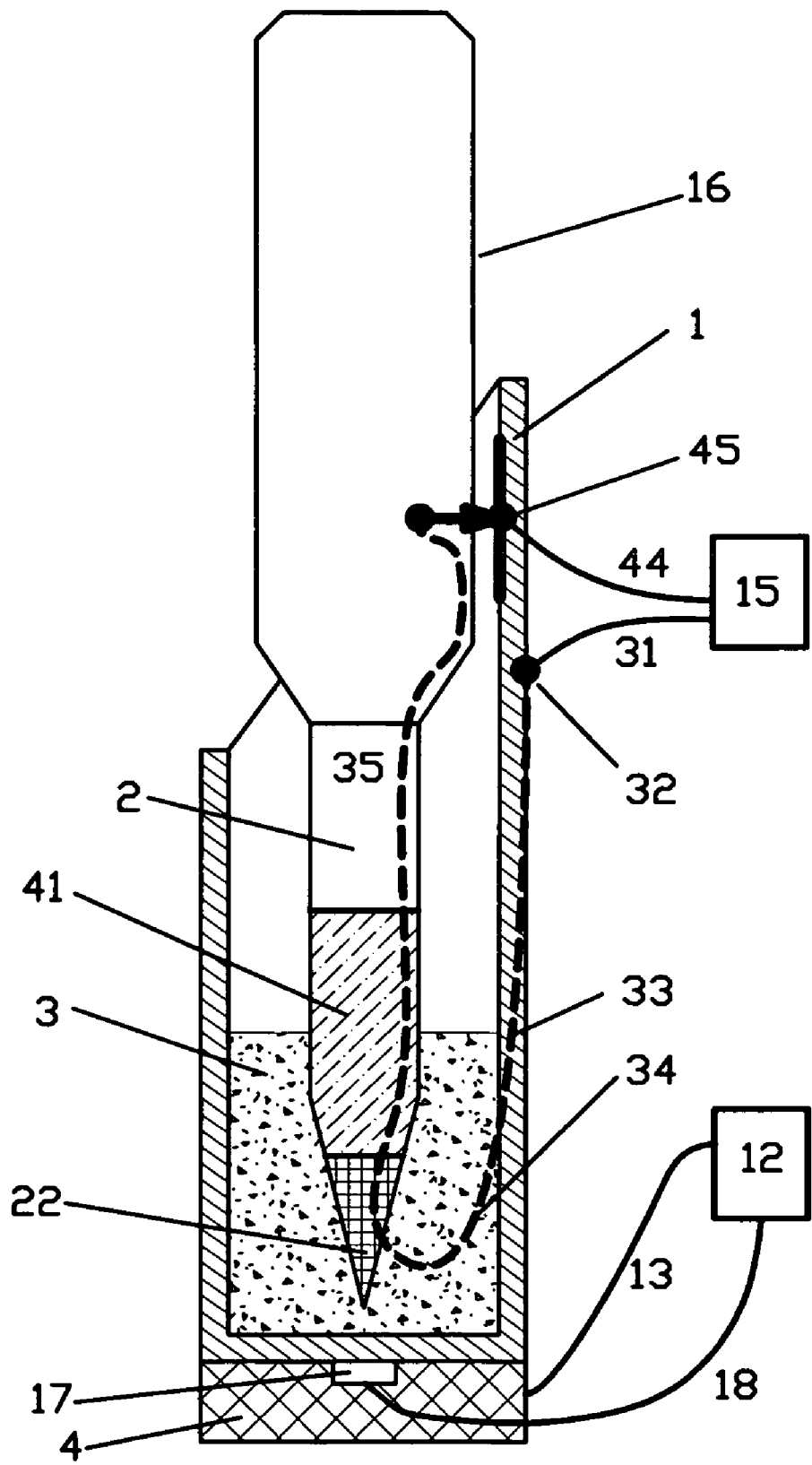
FIG. 9 shows the electrical block-diagram for the tip cleaning and plating by the electrolyses.

FIG. 1, FIG. 8 and FIG. 9 show the reservoir and a holder as a single detail. Also, reservoir and an iron holder can be assembled of different details comprises of two, or more, different parts depending of specific design.

Heater 4 is located on the side and/or bottom of reservoir 1. Heater may utilize virtually any of known principals of the heating: high resistance wire heater, such as nichrome; inductive heater; graphite single or dual electrode heaters, gas heater etc.

Figure 2:
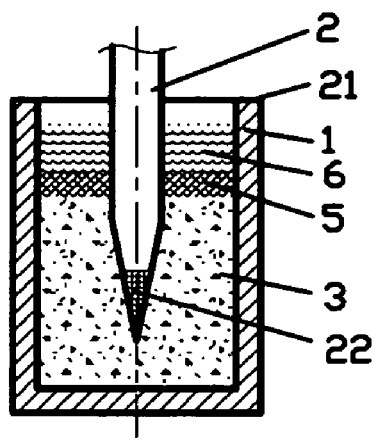
FIG. 2 shows a reservoir filled with molten solder and antioxidant.
Figure 3:
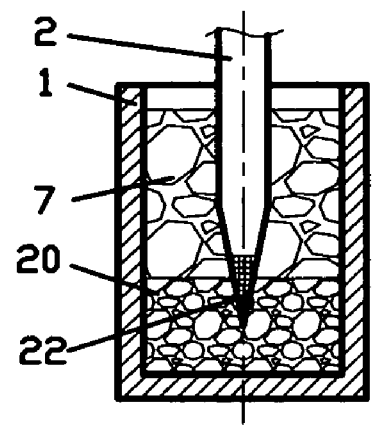
FIG. 3 shows a reservoir filled with wools having various densities.
Figure 4:
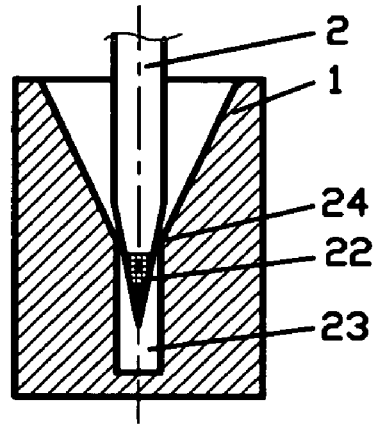
FIG. 4 shows a reservoir having cone-hole bottom and a line-contact with the iron tip.
Figure 5:
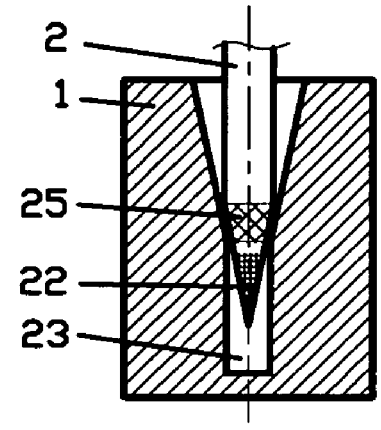
FIG. 5 shows a reservoir having cone-hole bottom and a surface-contact with the iron tip.
Figure 6:
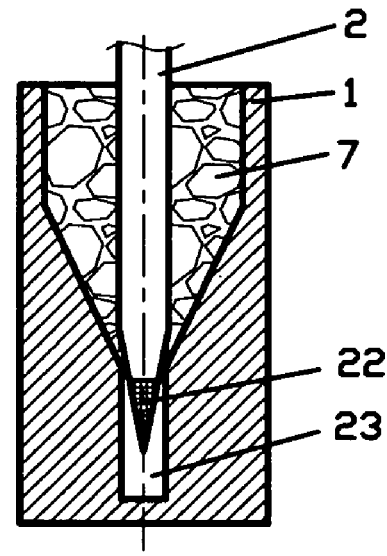
FIG. 6 shows a reservoir having cone-hole bottom and comprising the wool.

Iron tip protection from damage. Most irons for microelectronics soldering have sharp pointed tip made of copper, a soft material. Such sharp tip easy to be damaged if hits the reservoir bottom. Current invention is offering three solutions for preventing the tip from damage: a) non soluble in molten solder wool; b) cone-hole reservoir bottom; 3) iron magnetic holder in combination with a mechanical support:

a) FIG. 1 shows how the wool damper 20 prevents iron tip from reaching the cylinder bottom. FIG. 3 shows the reservoir comprising two levels of wool—bottom wool protects the end of the tip. Upper/side wool 7 works as a tip cleaner from the dross 5, antioxidant 6 and exceeding solder as shown in FIG. 2. Wool 7 and 20 may have different densities, for instances, bottom wool has higher density and top/side wool has lower density. FIG. 3 contains solder as well, and may contain antioxidant and dross, which are not shown for clarity. Examples of the wool material: soft material non-reacting with molten solder, like stainless steel, ceramic, fiberglass . . .

b) FIGS. 4, 5 and 6 show the tip protection made by cone-hole cylinder shape. FIG. 4 shows the line type contacts 24 between the reservoir 1 and the tip 2. FIG. 5 shows surface-type contact 25 between the reservoir 1 and the tip 2. FIG. 6 illustrates the cone-hole reservoir comprising the top wool only. Wool can be placed on the bottom of the hole as well, is not shown for clarity.

c) FIG. 1 shows the tip protection by the attaching the iron in the specific position on the holder/reservoir by magnetic holder in combination with the mechanical support. Magnetic holder details 11 and 8 attract the iron to the holder and mechanical supporter 47 and 48 fixes the iron in direction toward to the soldering reservoir. Magnetic holder comprising details 8 and 11, when at least one of them is made of permanent magnet or electromagnet, and another one—ferromagnetic. Does not matter which part made of magnetic or ferromagnetic has to be mounted to the iron and which one to the reservoir.

Antioxidants. Antioxidant 6 on FIG. 1 protects the molten solder surface from oxidation and also may restore the solder dross 5 by applying appropriate additives. The antioxidant has lower specific gravity than the solder 3 and floats above the solder, protecting the solder from oxidation. Thickness of the antioxidant may be as low as several microns using surface-tension-phenomena and up to several millimeters. The antioxidant 6 can be any materials having melting temperature lower than molten solder temperature, non-soluble in the liquid solder, resistant to oxidation at temperature over solder melting temperature, having the flash point, boiling point, and smoke temperature greater than the iron tip temperature, and non toxic. Examples of antioxidant material: high temperature oils like avocado oil; wave soldering oils; solder dross recovery powder; waxes; high temperature paraffin etc.

Solder dross 5, generated by molten solder 3, can be considered as antioxidant as well and can be used without or in mix of extra antioxidants like oils and powders. In this case, removing the dross is not necessary, as far as the wool 7 on FIG. 3 is applied above the dross for cleaning the tip each time the tip goes from the reservoir.

Most of the antioxidants work longer and produce less smoke/fume at lower temperature. The temperature controller 17 allows more accurate support the solder temperature at lowest level acceptable for specific solder.

Residual tip antioxidant improves the soldering process providing better heat transfer from the tip to the soldered part. It may replace the soldering flux in many cases, making process soldering cleaner, faster and keeping better gap between the close-located-pins of PCB mounted parts. The oil-based liquid antioxidant having higher surface tension provides better accumulating the solder around the soldering part and makes the gap between parts cleaner.

Method of control by keeping the solder temperature around the crystallization temperature. Well known fact that metals in solid condition are oxidizing dramatically slower than in liquid. Crystallization temperature is the lowest temperature when the solder can be considered as a liquid and keeping the solder at crystallization temperature is another way to dramatically minimize the solder oxidation. In this case, the solder surface will have semi-solid phase and iron hot tip gets easy into and out of such solder.

Another way to minimize the solder oxidation is to create the temperature gradient along the solder height. Reservoir heater for that, see heater 4 on FIG. 8, has to be located at the bottom or as far as possible from the solder surface level. In this case, the upper level of the reservoir 3 will have better cooling conditions and lower temperature than the bottom of such reservoir. Then solder will have variable viscosity along the solder height and where the top of the solder will be solid or semi-solid and the bottom will be liquid. Top solid surface will protect the liquid solder from oxidation.

Figure 7:
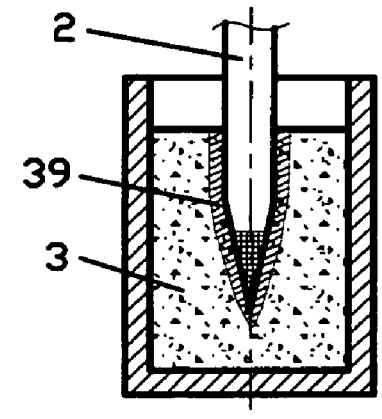
FIG. 7 shows a reservoir filled with a solid solder at temperature crystallization and soldering iron surrounded by the molten liquid solder layer.

Keeping the solid at the crystallization temperature may cause the semisolid pieces of solder to be attached to the iron tip when tip goes out of solder reservoir. Upper wool 7 on FIG. 3 will clean the iron tip from such residual solder. Another way to keep the tip 2 clean of the crystallized solder is to keep the tip temperature for several degrees higher than crystallized solder temperature. FIG. 7 shows the method when thin liquid layer 39 of the solder surrounds the tip 2 submerged into the solder 3 which is in solid or semisolid phase. The thickness of such layer is from fractions of millimeter to 2 millimeter and greater, depending on soldering iron tip dimensions and power. Such liquid solder layer 39 surrounding the tip is generated by the keeping tip 2 at higher temperature than the solder crystallization temperature.

Solder viscosity changes dramatically from liquid phase to solid over the solder crystallization temperature. Amount of the solder sticking to the tip is adjustable by changing the solder and iron temperature around the crystallization temperature. This method eliminates the extra solder core applying during the soldering.

Magnetic-electrical connectors. Above described magnetic holder details 11 and 8 on FIG. 1 may also be configured as electrical connector 43 on FIG. 8 and connector 45 on FIG. 9, providing the electrical connection between the iron 16 and holder 1. Parts 8 and 11 are made of electro-conductive material for such application. Parts 11 and 8 can be magnetic and electro-conductive at the same time, made of alnico alloy, for instance. Support 47-48 on FIG. 1 may be configured as an electrical connector as well.

Battery operated iron. FIG. 8 shows the electrical connections block-diagram for battery operated soldering iron. The advantage of this solution is that iron tip 2 and solder 3 are used as one of electrical connectors, and another one is either connector 43 on FIG. 8 or 47-48 on FIG. 1 or both of them. Path of the electrical current for the battery charging is: external power supply 15, wire 31 connected to the soldering reservoir 1, soldering reservoir case 33, solder 34 and wool (if any), tip 35, connector battery to the case 36, battery 38, iron controller 40, connector 43, wire 44, and power supply 15.

If soldering reservoir is made of non-electro-conductive material than wire 31 can be connected to the electro-conductive wool 7, or to the electro-conductive plate added into the reservoir (not shown).

Battery powered iron has two modes of operation: a) battery charging mode, when iron is in reservoir; b) iron tip heating mode, when iron is out of reservoir. The switching between modes is provided by the controller 40, which can be made of active elements, like a microchip or relay, or from passive elements like diodes.

Heat accumulator 10 on FIG. 8 is accumulating the heat energy from the external solder heater 4 with or without the simultaneous operation of the iron tip heater 9. The iron heat accumulator 10 extends the iron battery operation and provides better temperature stability of the tip. Example of such heat accumulator: extended copper tip having extra mass inside the iron as much as allows the iron design. Iron heater and heat accumulator can be combined in a single unit, providing both functions—heating and heat accumulating.

Electrolyses for the tip plating and cleaning. FIG. 9 shows the electrical current running through the tip 2 and providing an extra tip cleaning and the solder deposition by the electrolysis process (plating). The path of the current: power supply 15, wire 31, connection to the reservoir case 32, reservoir 33, solder 34, tip 35, connector 45, wire 44, power supply 15. The electrolysis (plating) circuit and battery charging circuit is combined as shown on FIG. 8, and can run independent as on FIG. 9. Electrical current can be DC, AC or pulse-variable length and polarity depending of material and desired results, for instance, positive current increases the tip-adhesive area, and negative polarity dissolves the tip copper making the tip thinner. Extra electro-conductive electrode inside the reservoir has to be applied if reservoir is made of dielectric material (ceramic, for instance).

In most cases the soldering iron tip end (cap) has plated 22 on FIG. 9 with a solder/tin/lead or similar metal or alloy for improving the flux and solder pickup. The tip end plating efficiency will be improved many times if non-plated tip area will have coating 41 with a low-electrically-conductive material, for instance ceramic. Such coating 41 increases the current density through the plated area 22.

The invention claimed is:

1. A soldering iron station equipped with a molten solder reservoir having a heater connected to a heater power supply, soldering iron having a tip and a tip heater connected to a iron battery or external power supply, and said iron tip is submerged into the reservoir molten solder covering the tip solder-adhesive area, and a soldering iron has a tip constant-temperature control method, wherein improvement comprises:
   a) a wool which is non-solvable in the molten solder and covering the molten solder reservoir bottom and said wool is firm and thick enough to prevent an end of the tip from hitting the reservoir bottom;
   b) a reservoir having a cone-shape bottom ending with a closed-hole and supporting the tip by a transition line or area between the cone and hole, and said support line/area is located above a solder-adhesive area of the tip, and said closed-hole is deep enough to prevent the tip from reaching the said hole end.

2. The soldering stations defined in claim 1, wherein the area between a reservoir side wall and tip is filled-up with a non-soluble in the molten solder wool.

3. The soldering station defined in claim 2, wherein the portion of wool is placed in air over the molten solder.

4. The soldering station defined in claim 1, wherein a molten solder reservoir contains a molten solder antioxidant that is non-reactive to and non-soluble in the molten solder and having a melting temperature above a melting temperature of the solder and specific gravity less then molten solder gravity.

5. The soldering station defined in claim 4, wherein an antioxidant is dielectric, high-surface-tension liquid is applied as a flux for the soldering process.

6. The soldering station defined in claim 4, wherein the antioxidant material comprises at least one, or combination of: oil, powder, oxide, salt, wax, paraffin.

7. The control method of a soldering station defined in claim 1, wherein a reservoir heater and/or iron heater keep a molten solder temperature above a solder melting temperature but lower than the antioxidant flash and/or smoke temperature.

8. The control method of a soldering station defined in claim 7, wherein the reservoir heater and/or iron heater keep the solder temperature close to a solder crystallization temperature but not exceed the range from minus 10 degrees Centigrade to plus 10 degrees Centigrade relatively to the solder crystallization temperature.

9. The control methods of a soldering station defined in claim 8, wherein the solder temperature is equal to or less then the solder crystallization temperature, and iron tip temperature is greater than solder crystallization temperature.

10. The control method of a soldering station defined in claim 1, wherein the iron heater has two modes of operation:
    a) molten solder temperature control mode, when the iron tip heater supports required temperature of the solder when iron tip is in contact with a solder;
    b) soldering mode, when the iron tip heater supports the temperature of the tip required for the soldering process when the tip is outside the solder.

11. The soldering station defined in claim 1, wherein reservoir heater comprises a heating element made of Positive Temperature Coefficient (PTC) ceramic fabricated to turn-on at temperature greater than the solder melting temperature and to turn-off at temperature less, than antioxidant flash and/or smoke temperature.

12. The soldering station defined in claim 1, when an iron battery is connected to the iron heater for the tip heating during the soldering process, and connected to the external power supply for charging when the iron tip has an electrical contact with a solder.

13. The soldering station defined in claim 1, wherein an iron tip is connected in series with the molten solder to the DC, AC or pulse power supply for cleaning and plating by the electrolysis.

14. The soldering station defined in claim 1, wherein an iron tip has a low electrically conductive coating above the solder-adhesive area.

15. The soldering station defined in claim 1, wherein soldering iron comprises a rechargeable heat accumulator consuming a heat energy from the molten solder and spending said heat for the soldering when the iron is out of holder.

16. The soldering station defined in claim 1, wherein a holder and soldering iron comprises magnetic and ferromagnetic details, and both details are forming the magnetic holder for the iron, and wherein one of them is attached to the iron and another one to the soldering station holder; and magnetic detail is made of permanent magnet or electromagnet.

17. The soldering station defined in claim 1, wherein an iron holder and an iron case is configured as an dual electrical connector wherein a first electrical connector is formed by molten solder and iron tip, and a second connector formed by two electro-conductive details, wherein first detail is mounted on the holder and insulated from reservoir, and second detail is mounted on the iron and insulated from the iron tip, and wherein the tip and iron-case-mounted details are electrically connected to a internal iron circuit, but reservoir and holder-mounted details are electrically connected to a external holder circuit.

* * * * *